(12) United States Patent
Picard et al.

(10) Patent No.: US 7,709,765 B2
(45) Date of Patent: May 4, 2010

(54) NETWORKING ARCHITECTURE FOR THERMAL PROCESSING SYSTEM

(75) Inventors: Tate S. Picard, Enfield, NH (US); Gregory S. Wilson, Newbury, NH (US); Jeffery L. Peterson, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 419 days.

(21) Appl. No.: 11/321,704

(22) Filed: Dec. 28, 2005

(65) Prior Publication Data
US 2007/0145019 A1    Jun. 28, 2007

(51) Int. Cl.
*B23K 10/00*    (2006.01)

(52) U.S. Cl. .......................... 219/121.39; 219/121.59; 219/121.48; 219/121.44

(58) Field of Classification Search ............ 219/121.39, 219/121.44, 121.48, 121.59, 75
See application file for complete search history.

(56) References Cited

U.S. PATENT DOCUMENTS

| | | | | |
|---|---|---|---|---|
| 5,155,547 A * | 10/1992 | Casper et al. | ................ | 356/316 |
| 5,361,260 A | 11/1994 | Mito | ..................... | 370/85.1 |
| 5,452,419 A | 9/1995 | Di Giulio et al. | ........ | 395/200.01 |
| 5,499,374 A | 3/1996 | Di Giulio et al. | ............ | 395/728 |
| 5,510,596 A | 4/1996 | Xu et al. | ................. | 219/130.01 |
| 5,687,103 A | 11/1997 | Hagl et al. | .............. | 364/514 R |
| 5,866,872 A * | 2/1999 | Lu et al. | ................ | 219/121.56 |
| 5,894,709 A | 4/1999 | Fosshage | ..................... | 53/450 |
| 5,988,846 A | 11/1999 | Flamm et al. | ............... | 364/137 |
| 6,049,744 A | 4/2000 | Kinoshita et al. | ........... | 700/195 |
| 6,222,155 B1 * | 4/2001 | Blackmon et al. | ...... | 219/121.39 |
| 6,248,975 B1 | 6/2001 | Lanouette et al. | ...... | 219/130.21 |
| 6,275,741 B1 | 8/2001 | Choi | ......................... | 700/200 |
| 6,359,251 B1 | 3/2002 | Picard et al. | ........... | 219/121.57 |
| 6,544,023 B2 | 4/2003 | Hofmann | ..................... | 425/143 |
| 6,622,058 B1 | 9/2003 | Picard et al. | ................ | 700/117 |
| 6,681,138 B2 | 1/2004 | Möhler et al. | ................ | 700/17 |
| 6,757,583 B2 | 6/2004 | Giamona et al. | ............ | 700/189 |
| 6,826,432 B2 | 11/2004 | Beck et al. | .................... | 700/18 |
| 6,849,826 B2 | 2/2005 | Hayes | ................... | 219/130.01 |
| 6,900,408 B2 | 5/2005 | Picard et al. | ........... | 219/121.55 |
| 6,925,349 B2 | 8/2005 | Albrecht et al. | ............. | 700/128 |
| 6,947,802 B2 | 9/2005 | Picard et al. | ................ | 700/117 |
| 2001/0040153 A1 | 11/2001 | Lanouette et al. | ...... | 219/130.21 |
| 2002/0108939 A1 | 8/2002 | Mayer | ................... | 219/121.79 |
| 2003/0062351 A1 | 4/2003 | Davidson et al. | ......... | 219/130.5 |
| 2005/0051523 A1 | 3/2005 | Legge et al. | ........... | 219/121.83 |

(Continued)

OTHER PUBLICATIONS

Telebyte, Fiber Optic Products, available at http://web.archive.org/web/20050306195438/http://telebyteusa.com/catalog/products/272.htm, last visited on Feb. 21, 2006, pp. 1-2.

(Continued)

*Primary Examiner*—Mark H Paschall
(74) *Attorney, Agent, or Firm*—Proskauer Rose LLP

(57) ABSTRACT

A thermal processing system includes a thermal torch for processing a workpiece, a power supply for providing power to the thermal torch, a positioning system for relatively moving the thermal torch and the workpiece, a controller for controlling the thermal processing system, and a deterministic-based communication network, such as, for example, a network which operates using SERCOS. The deterministic-based communications network connects at least the controller, the power supply, and the positioning system of the thermal processing system together.

32 Claims, 3 Drawing Sheets

U.S. PATENT DOCUMENTS

| | | | |
|---|---|---|---|
| 2005/0127053 A1 | 6/2005 | Hayes | 219/130.01 |
| 2005/0175346 A1 | 8/2005 | Takeguchi et al. | 398/83 |
| 2006/0049152 A1* | 3/2006 | Matus | 219/121.54 |
| 2006/0163227 A1* | 7/2006 | Hillen et al. | 219/130.01 |
| 2007/0051711 A1* | 3/2007 | Kachline | 219/130.01 |
| 2007/0080149 A1 | 4/2007 | Albrecht et al. | 219/130.01 |
| 2007/0080150 A1 | 4/2007 | Albrecht et al. | 219/130.01 |
| 2007/0080151 A1 | 4/2007 | Albrecht et al. | 219/130.01 |
| 2007/0080152 A1 | 4/2007 | Albrecht et al. | 219/130.01 |

OTHER PUBLICATIONS

Hypertherm, Automation Technology, Field Facts, vol. 3, Issue 2, Jun. 2004, pp. 1-4.

"Mariner CNC Control," http://web.archive.org/web/20050213183314/www.hyperthermautomation.com/mariner.html, Feb. 13, 2005, 2 pages.

Zuo, et al. "The Design of an Open Controller for an Industrial Robot," Intelligent Control and Automation, 2004, WCICA 2004, Fifth World Congress on Hangzhou, China, Jun. 15-19, 2004, vol. 15, pp. 4696-4700.

* cited by examiner

NETWORKING ARCHITECTURE FOR THERMAL PROCESSING SYSTEM

FIELD OF THE INVENTION

The present invention relates generally to a method and apparatus for networking a thermal processing system.

BACKGROUND

Thermal processing systems, such as laser and plasma arc systems, are widely used in the cutting, welding, heat treating, and processing of metallic materials. A laser-based apparatus generally includes a nozzle through which a gas stream and laser beam pass to interact with a workpiece. Both the beam and the gas stream exit the nozzle through an orifice and impinge on a target area of the workpiece. The laser beam heats the workpiece. The resulting heating of the workpiece, combined with any chemical reaction between the gas and workpiece material, serves to heat, liquefy and/or vaporize a selected area of workpiece, depending on the focal point and energy level of the beam. This action allows the operator to cut or otherwise modify the workpiece.

A plasma arc torch generally includes a cathode block with an electrode mounted therein, a nozzle with a central exit orifice mounted within a torch body, electrical connections, passages for cooling and arc control fluids, a swirl ring to control fluid flow patterns in the plasma chamber formed between the electrode and nozzle, and a power supply. The torch produces a plasma arc, which is a constricted ionized jet of a plasma gas with high temperature and high momentum that exits through the nozzle orifice and impinges on the workpiece. Gases used in the torch can be non-reactive (e.g., argon or nitrogen), or reactive (e.g., oxygen or air).

In general, a thermal processing system includes a laser-based or plasma-based torch, an associated power supply, a gas console, a positioning apparatus, a cutting table, a torch height control, and an associated computerized numeric controller (CNC).

In operation, a user places a workpiece on the cutting table and mounts the torch on the positioning apparatus, which provides relative motion between the tip of the torch and the workpiece to direct the laser beam or the plasma arc along a processing path. The user provides a start command to the CNC to initiate the cutting process. The CNC accurately directs motion of the torch and/or the cutting table to enable the workpiece to be cut to a desired pattern. The CNC is in communication with the positioning apparatus. The positioning apparatus uses signals from the CNC to direct the torch along a desired cutting path. Position information is returned from the positioning apparatus to the CNC to allow the CNC to operate interactively with the positioning apparatus to obtain an accurate cut path.

The power supply provides the electrical current necessary to generate the laser beam or the plasma arc. The power supply has one or more dc power modules to produce a constant current for the torch. Typically, the current can be set to discreet values. The power supply has a microprocessor, which regulates essentially all torch system functions, including start sequence, CNC interface functions, gas and cut parameters, and shut off sequences. For example, the microprocessor can ramp-up or ramp-down the electrical current. The main on and off switch of the power supply can be controlled locally or remotely by the CNC. The power supply also houses a cooling system for cooling the torch.

The gas console controls flow of gases to the torch. The gas console houses solenoid valves, flow meters, pressure gauges, and switches used for gas flow control, which for the plasma-based torch includes plasma gases and shield gases. The flow meters are used to set the preflow rates and cut flow rates for the plasma and shield gases. The gas console also has a multi-inlet gas supply where the required gases can be connected. A toggle switch can be used to select the gases. The gases are monitored by gas pressure gages. To operate the gas console, all settings typically are manually selected.

The torch height control sets the height of the torch relative to the work piece. The torch height control, typically, has its own control module to control an arc voltage during cutting by adjusting the standoff (i.e., the distance between the torch and the work piece), to maintain a predetermined arc voltage value. The torch height control has a lifter, which is controlled by the control module through a motor, to slide the torch in a vertical direction relative to the work piece to maintain the desired voltage during cutting.

Manufacturers of thermal processing systems typically act as system integrators of components. Thermal processing systems are designed such that the control functions of the system are centralized at the CNC. The other components on the system's network operate based on the commands issued by and transmitted from the CNC. Because hardware and software for client networking does not exist for thermal processing systems, each component typically has its own customized electrical hardware and/or software interface based on a customer's specification. These interfaces use contention-based network access methods (i.e., non-deterministic access methods) for transmitting data between components. Contention-based networks require each component to test the transmission medium in order to see if it is in an acceptable state before transmitting data. As a consequence, timely access is not guaranteed and possible data collisions are possible if two devices send data simultaneously. As a result, contention-based networks limit the speed and reliability of a system.

SUMMARY OF THE INVENTION

One approach to networking a thermal cutting system is to use a deterministic-based control access method. In one aspect, there is a method of operating a thermal processing system capable of processing a workpiece. The method involves connecting to a network a torch for processing the workpiece, a power supply for providing power to the torch, a positioning system for relatively moving the torch and the workpiece, and a controller for controlling the thermal processing system, and transmitting data over the network using a deterministic-based communication protocol.

In another aspect, there is a method of operating a thermal processing system capable of processing a workpiece. The method involves transmitting data over a network using a deterministic-based protocol to provide instructions to a thermal torch for processing the workpiece, a power supply for providing power to the thermal torch, a positioning system for relatively moving the thermal torch and the workpiece, and a controller.

In another aspect, there is a thermal processing system capable of processing a workpiece. The system comprises a thermal torch for processing the workpiece, a power supply for providing power to the thermal torch, a positioning system for relatively moving the thermal torch and the workpiece, a controller for controlling the thermal processing system, and a deterministic-based communication network. The deterministic-based communication network connects at least the controller, the power supply, and the positioning system.

In another aspect, there is a thermal processing system capable of processing a workpiece. The system comprises a thermal torch for processing the workpiece, a power supply for providing power to the thermal torch, a positioning system for relatively moving the thermal torch and the workpiece, and a deterministic-based communication network. The deterministic-based communication network connects at least the power supply, and the positioning system. One or more of the power supply and the positioning system comprise controlling means for controlling the thermal processing system.

In other examples, any of the aspects above can include one or more of the following features. The controller can include a computer numeric controller. The deterministic-based communication network can include a ring network. The deterministic-based communication network can include a star network. The deterministic-based communication network can include a mesh network. The deterministic-based network can transmit data over wire or fiber optic cable. The wire can include a Universal Serial Bus (USB) cable. The deterministic-based communication network can be a wireless network. Some examples of deterministic-based networks include SERCOS, deterministic-based Ethernet, FIREWIRE, and ModBus Communication protocol. However, other deterministic-based networks can also be used in thermal processing systems. In some embodiments, the deterministic-based network can operate at speeds equal to or greater than about 4 Mbps. In other embodiments, the deterministic-based network can operate at speeds of at least about 16 Mbps. The system can comprise an automatic gas console. The automatic gas console can be connected with the deterministic-based network. The thermal torch can be a plasma arc torch. The thermal torch can be a laser torch. The thermal torch can be a liquid metal jet. One or more of the power supply and the positioning system can comprise controlling means for controlling the thermal processing system.

In another aspect, there is an apparatus. The apparatus comprises an electronic interface for connecting to an electronic wire, a fiber optic interface for connected to an optical fiber, and a converter for converting between electrical signals received from the electronic interface and optical signals received from the fiber optic interface. The converter including means for using a networking protocol.

In some embodiments, the networking protocol is a deterministic-based protocol. The converter can be used in thermal processing systems.

In another aspect, there is an apparatus. The apparatus comprises a converter for converting wireless signals received over a wireless network into electrical signals transmitted to an electronic interface. The converter including means for using a deterministic-based networking protocol.

Any of the above implementations can realize one or more of the following advantages. A thermal processing system that uses a deterministic-based communication network allows for the fast and reliable transmission of data. In addition, due to the high-speed data transmission rates, deterministic-based communication networks allow for real-time control (e.g., feedback control) of process variables. Moreover, using ring topographies and/or wireless communications for the deterministic-based network minimizes the complexity and amount of network wiring required as compared to prior or conventional thermal processing network designs. The amount of wiring can further be reduced by using optical fibers in place of traditional copper wiring. As a result, network noise generally associated with copper wiring can be minimized, thereby increasing the efficiency and reliability of data transmission. In addition, optical fibers and/or wireless communications allow for longer connections between components in the network. Thus, the network of a thermal processing system can easily be configured with respect to the location of the components and the network can easily be maintained due to the small number of optical fibers used to couple the components. As a result of the above described advantages, operators using a thermal processing system including a deterministic-based communication network can efficiently and accurately process a workpiece with less time spent maintaining and supervising the network than with conventional systems which use contention-based networks.

Other aspects, examples, and advantages of the present invention will become apparent from the following detailed description, taken in conjunction with the accompanying drawings, illustrating the principles of the invention by way of example only.

BRIEF DESCRIPTION OF THE DRAWINGS

The foregoing and other features and advantages of the present invention, as well as the invention itself, will be more fully understood from the following description of various embodiments, when read together with the accompanying drawings.

DETAILED DESCRIPTION

Manufacturers of thermal processing systems commonly act as system integrators of components, coupling the system components together to form a network. The network of a thermal processing system can be made more efficient if a deterministic-based networking protocol is used, wherein each component's access to the transmission medium is controlled for transmitting and/or receiving data. Deterministic-based access methods allow for reliable, time-critical, and high speed network access. Reliable and high speed network access based on deterministic network protocols allows for the distribution of system control from the CNC to each component, wherein each node via their own processing unit (e.g., a CPU) becomes "intelligent." The evolution from central node processing to distributed intelligence allows for benefits in conserving bandwidth as well as improvements in real-time system performance. In addition, each intelligent node can be programmed individually. As a result, the network can be systematically updated and maintained.

Deterministic-based networks can be implemented using software, hardware, or a combination thereof. A software implementation can be, for example, a network adapted to use a signal (e.g., a token) that notifies a component when it can send and/or receive data. A hardware implementation can be, for example, a network wherein each component's interface to the transmission medium is adapted to transmit and/or receive data at predetermined times. Hardware implementations of a deterministic-based network can be combined with software to enhance the integration of the thermal processing system's components. Hardware and software interconnectivity can be based, for example, on the SERCOS (SErial Real-time COmmunicationS) protocol. SERCOS is a real-time deterministic data transfer protocol used for motion and I/O control in servo drive systems and allows for high bandwidth data transfers in excess of 2 Mbps. In addition to high data transfer rates, the network protocol can be adapted so that when additional system components are added to the network they are automatically recognized and/or configured. While the examples and embodiments described below make reference to using SERCOS, any other deterministic-based software protocols can also be used. Examples of some deterministic-based protocols include industrial Ethernet, FIREWIRE® (Apple Computer, Inc., Cupertino, Calif.), and ModBus Communication Protocol (Delta Tau Data Systems Inc., Chatsworth, Calif.).

Figure 1:
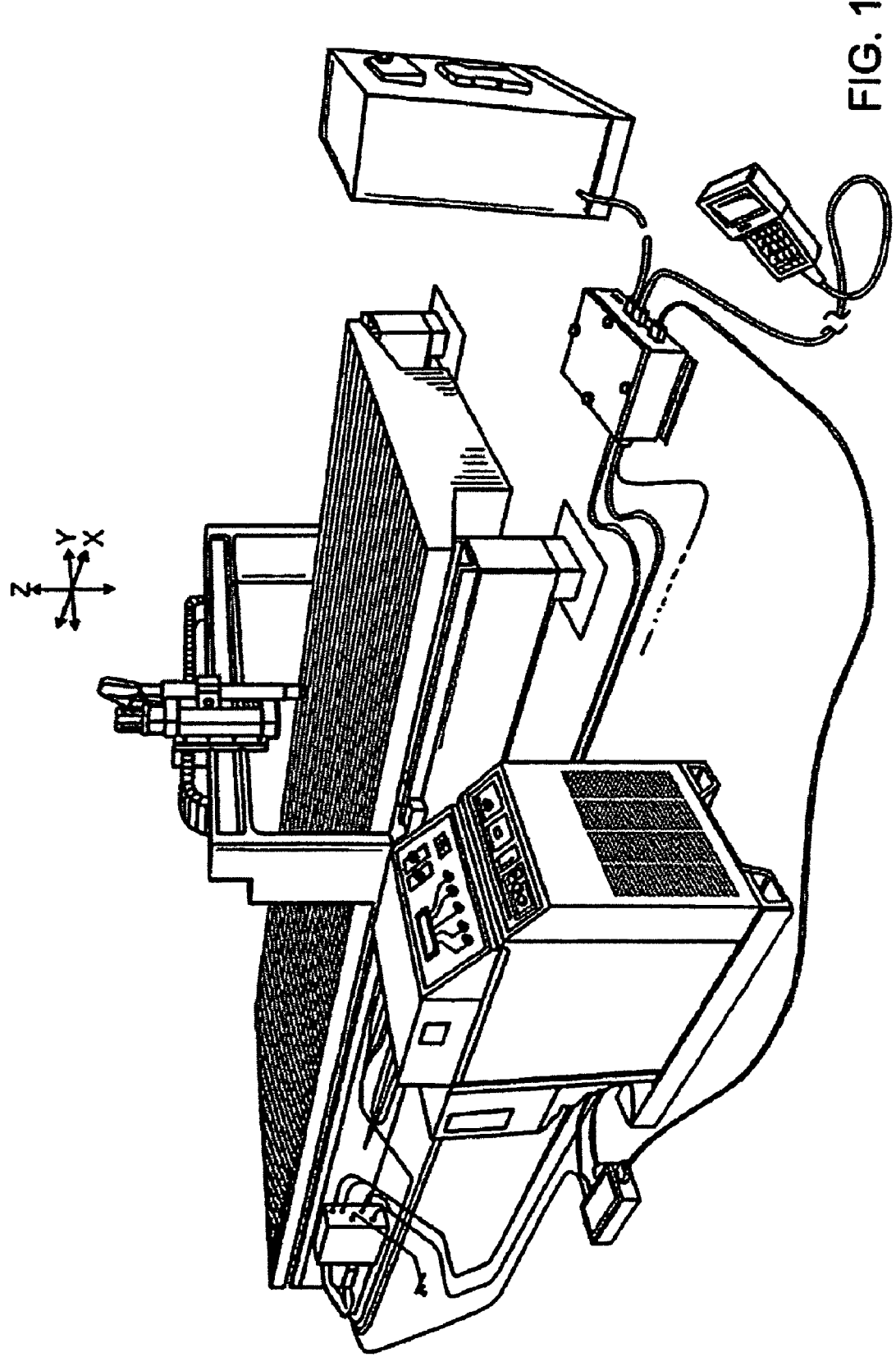
FIG. 1 is a schematic diagram of a thermal processing system.
Figure 2:
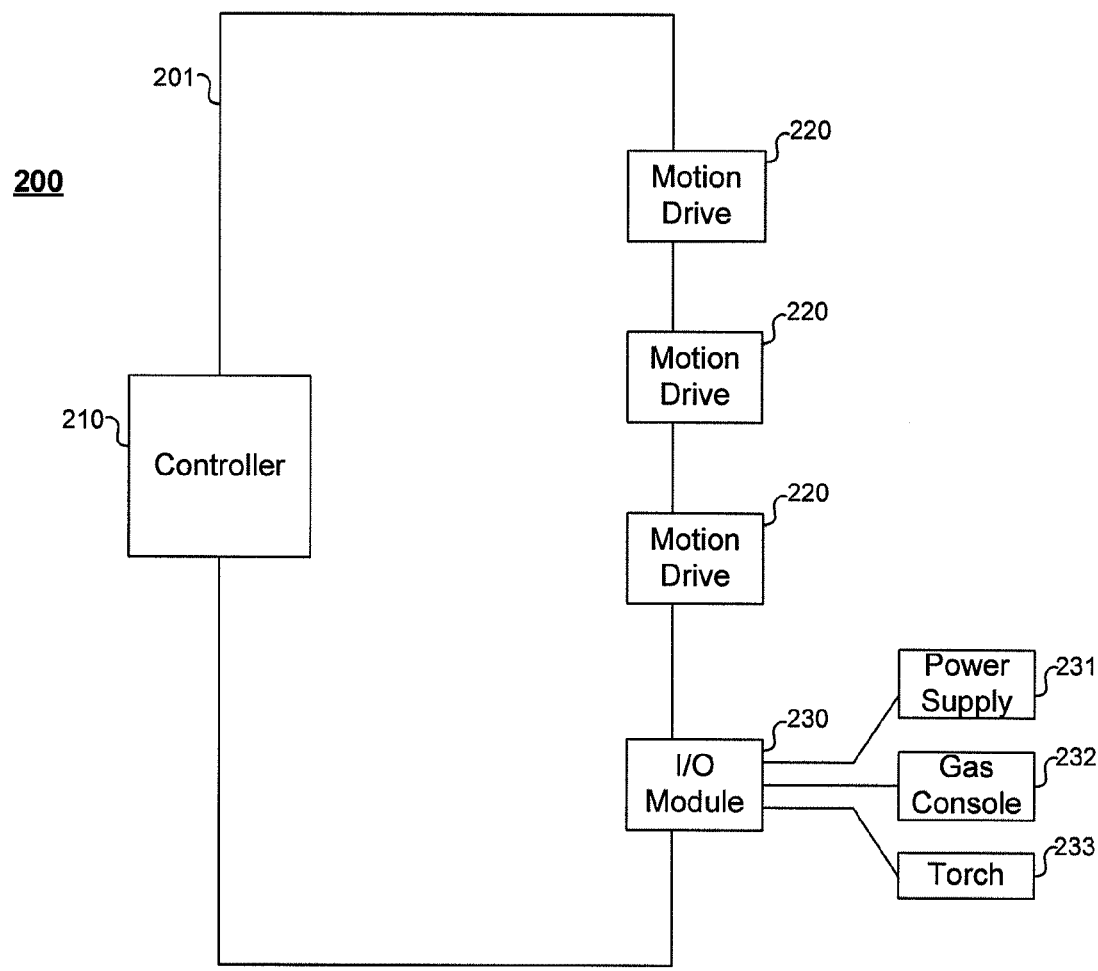
FIG. 2 is a block diagram showing an exemplary network with devices related to network architecture for a thermal processing system.

FIG. 2 illustrates an exemplary deterministic-based network 200 for a thermal processing system. The deterministic-based network 200 includes a central controller 210 (e.g., a computerized numeric controller (CNC)) for controlling the thermal processing system, one or more motion drives 220 (e.g., a servo drive such as from the AX2000 Series manufactured by Beckhoff Automation (Burnsville, Minn.), or from the PC840 Servo Drive Series manufactured by Danaher Motion (Wood Dale, Ill.)) for controlling the position of the torch 231, and an input/output module 230 adapted for deterministic-based communications. All of the components of the deterministic-based network 200 communicate with one another through transmission medium 201, which is deterministically accessed by the components for transmission and/or reception of data. In the embodiment shown in FIG. 2, the transmission medium 201 is optical fiber, which transmits information optically. In other embodiments, not shown, the transmission medium 201 can be other types of fiber or cable, e.g., copper wire, USB cable, or any combination thereof. In some embodiments, the transmission medium includes software and hardware to communicate wirelessly.

The module 230 of deterministic-based network 200 couples the torch 231, the torch power supply 232, and the automatic gas consoles 233 to the thermal processing network 200. The torch 231 can be a plasma arc torch, a laser torch, or a liquid metal jet, such as, for example, the liquid metal jet described in U.S. Pat. No. 6,525,291. The torch power supply 232 provides power to the torch 231. The automatic gas console 233 controls the processing gasses or process variables to the torch 231.

In this embodiment, the torch power supply 231, the automatic gas consoles 232, and the torch 233 are coupled to the network 200 via an input/output module 230, but other configurations can also be used, e.g., the components 231-233 can be adapted to be directly coupled to the transmission medium 201. In addition, in this embodiment the one or more motion drives 220 are directly coupled to the transmission medium 201, but other configurations can also be used, e.g., one or more of the motion drives 220 can be coupled to the transmission medium 201 via an input/output module. The motion drive input/output module can be adapted to use the SERCOS protocol, e.g., a SERCOS interface module manufactured by Bosch Rexroth Corp. (Hoffman Estates, Ill.).

The deterministic-based network 200, shown in FIG. 2, is configured in a ring topology, interconnected by the transmission medium 201. However, other topology configurations exist. For example, in some embodiments, the deterministic-based network 200 can have a star topology, a mesh topology, a bus topology, or a hybrid of these topologies. In addition, the deterministic-based network 200 can be implemented using a wireless network with a wireless transmission medium 201. Wireless and fiber optic transmissions offer superior noise immunity, signal transmission distances, and higher signal bandwidth when compared to traditional copper cabling, which are prone to noise induced by the high energy of the power supply systems.

Thermal processing systems that include a deterministic-based communication network provide a number of advantages over conventional thermal processing systems. For example, a deterministic-based communication network allows for the fast and reliable transmission of data (e.g., equal to or greater than about 4 Mbps, and in some embodiments greater than about 16 Mbps). In addition, due to the fast data transmission rates, deterministic-based communication networks allow for real-time control (e.g., feedback control) of process variables such as, for example, motion path generation, fault and diagnostic routines and cutting process variables. Moreover, using ring topographies and/or wireless communications for the deterministic-based network 200 minimizes the complexity and amount of network wiring required as compared to prior designs. The amount of wiring can further be reduced by using optical fibers in place of traditional copper wiring. As a result, network noise generally associated with copper wiring can be minimized, thereby increasing the efficiency and reliability of data transmission. In addition, optical fibers and/or wireless communications allow for longer connections between components in the network. Thus, the network of a thermal processing system can easily be configured with respect to the location of the components (i.e., the user is not limited to keeping components within a certain distance as required by copper cable) and the network can easily be maintained due to the small number of optical fibers used to couple the components. As a result of the above described advantages, operators using a thermal processing system including a deterministic-based communication network can efficiently and accurately process a workpiece with less time spent maintaining and supervising the network than with conventional systems using contention-based networks.

To create a thermal processing system for cutting or processing workpieces, an operator can connect to a deterministic-based network, a torch, a torch power supply, a positioning system for moving the torch with respect to the workpiece, and a CNC for controlling the processing of the workpiece. For example, the operator can connect the torch, the torch power-supply, the positioning system, and a CNC together using optical fiber in a ring topology. By using a SERCOS-based network, data can be transmitted via the optical fiber between the components for processing the workpiece.

Components with interfaces for traditional wire cabling, e.g. RS 422-based cable, and/or non-deterministic interface capability can be connected to the deterministic-based network 200 using the input/output module 230. The input/output module 230 can also be adapted to use the SERCOS protocol for efficiently receiving and/or transmitting information between the components 231-233 and the deterministic-based network 200. The input/output module 230 translates between the network protocol used by the transmission medium 201 and the protocols used by the components 231-233.

Figure 3:
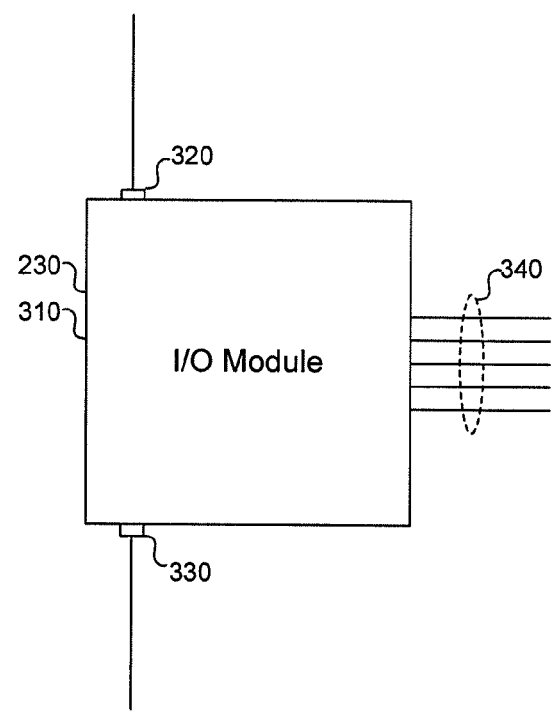
FIG. 3 is a block diagram showing an input/output module for a deterministic-based and/or ring network

FIG. 3 illustrates the input/output module as a converter 310 when the transmission medium 201 is optical fiber. The converter 310 has at least two optical interfaces, 320 and 330, for connecting to the deterministic-based network 200. The converter 310 also has an electronic interface with one or more wires 340 for connecting to one or more components of the thermal processing system, e.g., the components 231-233. The converter 310 is adapted to operate and convert information at the speed of the deterministic-based network 200 to allow for efficient communication between the components 231-233. For example, the converter 310 can operate at speeds equal to or greater than about 4 Mbps and in some embodiments, greater than about 16 Mbps.

Other types of converters can also be used within a thermal processing system. For example, in a wirelessly networked system, a converter which includes a deterministic-based networking protocol and means for converting wirelessly received information into electrical signals acceptable to an electrical interface can be utilized. One skilled in the art will appreciate that, in some embodiments, the converter for a wirelessly networked system, is positioned at a standard electrical interface of each of the components to be wirelessly networked. Each converter would receive and transmit signals wirelessly over a deterministic-based network while, at the same time, also convert wireless signals into electrical signals which can be accepted by the standard electrical interfaces.

To process a workpiece using the thermal processing system including the deterministic-based communication network 200, an operator positions the workpiece on a cutting table which has a positioning system controlled by motion drives 220 connected to the deterministic-based network 200. The operator inputs cutting instructions using the CNC 210, which is also connected to the deterministic-based network 200. In some embodiments, the CNC 210 includes a number of processing instructions stored in its internal memory. For example, a catalog of processing instructions may be stored within the CNC 210 such that an operator merely needs to enter a part number into the CNC 210, which contains the specific processing instructions for that part number as well as a number of different part numbers. The operator activates the CNC 210 which sends the operating instructions over the transmission medium 201 to the other components on the deterministic-based network 200 (e.g., the torch 231, the power supply for the torch 232, the automatic gas console 233, and the positioning system controlled by motion drives 220) to begin processing of the workpiece. Feedback information sampled during processing can be transmitted in real-time over the transmission medium 201 to each of the components of the deterministic-based network 200. As a result, the CNC 210 can adjust the processing information transmitted to the components in real-time to produce a higher quality product.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A thermal processing system capable of processing a workpiece, the system comprising:
    a thermal torch for processing the workpiece;
    a deterministic-based distributed communication network;
    a power supply for providing power to the thermal torch, the power supply connected to the communication network and including a first processing unit with a deterministic-based networking protocol for communicating with the communication network;
    a positioning system for relatively moving the thermal torch and the workpiece, the positioning system connected to the communication network and including a second processing unit with the deterministic-based networking protocol for communicating with the communication network; and
    a controller for controlling the thermal processing system, the controller connected to the communication network and including a third processing unit with the deterministic-based networking protocol for communicating with the communication network.

2. The system of claim 1, wherein the controller comprises a computer numeric controller.

3. The system of claim 1, wherein the communication network comprises a ring network.

4. The system of claim 1, wherein the communication network comprises a star network.

5. The system of claim 1, wherein the communication network comprises a mesh network.

6. The system of claim 1, wherein the communication network transmits data over wire or fiber optic cable.

7. The system of claim 6, wherein the wire comprises a USB cable.

8. The system of claim 1, wherein the communication network is a wireless network.

9. The system of claim 1, wherein the deterministic-based networking protocol comprises at least one of SERCOS, deterministic-based Ethernet, or FIREWIRE.

10. The system of claim 1, wherein the communication network operates at speeds greater than about 4 Mbps.

11. The system of claim 1, wherein the communication network operates at speeds of at least about 16 Mbps.

12. The system of claim 1 further comprising an automatic gas console, the automatic gas console connected to the communication network and including a fourth processing unit with a deterministic-based networking protocol for communicating with the communication network.

13. The system of claim 1, wherein the thermal torch is a plasma arc torch.

14. The system of claim 1, wherein the thermal torch is a laser torch.

15. The system of claim 1, wherein the thermal torch is a liquid metal jet.

16. The system of claim 1, wherein one or more of the power supply and the positioning system comprise controlling means for controlling the thermal processing system.

17. A thermal processing system capable of processing a workpiece, the system comprising:
    a thermal torch for processing the workpiece;
    a deterministic-based distributed communication network;
    a power supply for providing power to the thermal torch, the power supply connected to the communication network and including a first processing unit with a deterministic-based networking protocol for communicating with the communication network; and
    a positioning system for relatively moving the thermal torch and the workpiece, the positioning system connected to the communication network and including a second processing unit with the deterministic-based networking protocol for communicating with the communication network wherein one or more of the power supply and the positioning system comprise controlling means for controlling the thermal processing system.

18. A method of operating a thermal processing system capable of processing a workpiece, the method comprising:
    connecting to a distributed communication network a thermal torch for processing the workpiece, a power supply for providing power to the thermal torch, a positioning system for relatively moving the thermal torch and the workpiece, and a controller for controlling the thermal processing system, the power supply including a first processing unit, the positioning system including a second processing unit, the controller including a third processing unit, wherein the first, second, and third processing units include a deterministic-based networking protocol for communicating with the communication network; and transmitting, by the power supply, the positioning system, or the controller, data over the communication network using the deterministic-based communication protocol.

19. The method of claim 18, wherein the controller includes a computer numeric controller.

20. The method of claim 18, wherein the communication network comprises a ring network.

21. The method of claim 18, wherein the communication network comprises a star network.

22. The method of claim 18, wherein the communication network comprises a mesh network.

23. The method of claim 18, wherein the communication network transmits data over copper wire or fiber optic cable.

24. The method of claim 18, wherein the communication network comprises a wireless network.

25. The method of claim 18, wherein the deterministic-based networking protocol comprises at least one of SERCOS, deterministic-based Ethernet, or FIREWIRE.

26. The method of claim 18, further comprising connecting to the communication network an automatic gas console, the automatic gas console including a fourth processing unit with the deterministic-based networking protocol for communicating with the communication network.

27. The method of claim 18, wherein the thermal torch is a plasma arc torch.

28. The method of claim 18, wherein the thermal torch is a laser torch.

29. A method of operating a thermal processing system capable of processing a workpiece, the method comprising:

transmitting data over a distributed communication network using a deterministic-based networking protocol to provide instructions to a thermal torch for processing the workpiece, a power supply for providing power to the thermal torch, a positioning system for relatively moving the thermal torch and the workpiece, and a controller, the power supply including a first processing unit, the positioning system including a second processing unit, the controller including a third processing unit, wherein the first, second, and third processing units include a deterministic-based networking protocol for communicating with the communication network.

30. The method of claim 29, wherein the communication network operates at speeds greater than about 4 Mbps.

31. The method of claim 29, wherein the deterministic-based networking protocol comprises at least one of SERCOS, deterministic-based Ethernet, or FIREWIRE.

32. The method of claim 29, wherein the communication network is a ring network, a star network, a mesh network, or a wireless network.

* * * * *